United States Patent [19]

Buit

[11] 4,202,086
[45] May 13, 1980

[54] METHOD OF ASSEMBLING THE PARTS OF A HEAT EXCHANGER, AND A HEAT EXCHANGER THUS ASSEMBLED

[75] Inventor: Klaas Buit, Wassenaar, Netherlands

[73] Assignee: B.V. Neratoom, The Hague, Netherlands

[21] Appl. No.: 932,786

[22] Filed: Aug. 11, 1978

[30] Foreign Application Priority Data

Aug. 17, 1977 [NL] Netherlands .................. 7709088

[51] Int. Cl.² ........................................... B23P 15/26
[52] U.S. Cl. .................................. 29/157.3 R; 165/76; 165/79; 29/DIG. 25; 29/DIG. 48; 29/402.08
[58] Field of Search ........ 29/157.3 C, 157.4, 157.3 R; 176/65; 165/76, 79

[56] References Cited
U.S. PATENT DOCUMENTS

| | | | |
|---|---|---|---|
| 2,363,526 | 11/1944 | Hobbs | 165/76 X |
| 3,352,756 | 11/1967 | Lockett et al. | 176/87 X |
| 4,035,232 | 7/1977 | Kube | 176/65 |

FOREIGN PATENT DOCUMENTS 2115434 10/1971 Fed. Rep. of Germany .......... 29/157.4

*Primary Examiner*—Francis S. Husar
*Assistant Examiner*—V. K. Rising
*Attorney, Agent, or Firm*—Kenyon & Kenyon

[57] ABSTRACT

A method of assembling the parts of a heat exchanger, in which a pipe bundle is lowered into an open-topped vessel, and a wall of the bundle is secured to the wall of the vessel by welding. Prior to placing the bundle in position, a sealing ring is provided around the bundle between the outer periphery of a circumferential wall thereof and the inner periphery of the wall of the vessel, which ring hermetically seals the annular opening between the pipe bundle and the wall of the vessel after the bundle has been placed in position. The sealing ring is desirably made of a deformable material having suitable dimensions to be compressed axially between an outwardly extending wall portion of the pipe bundle and an inwardly extending wall portion of the vessel when the pipe bundle is fully lowered into the vessel. The seal ring may be made of material which melts at the operating temperature of the heat exchanger and can be thereby eliminated after welded joint has been tested satisfactorily. The method is particularly applicable to the assembly of heat exchangers for sodium-cooled nuclear reactors, in which case the seal is made desirably from solidified sodium.

5 Claims, 4 Drawing Figures

METHOD OF ASSEMBLING THE PARTS OF A HEAT EXCHANGER, AND A HEAT EXCHANGER THUS ASSEMBLED

This invention relates to a method of assembling the parts of a heat exchanger, which comprises lowering a bundle of pipes including supply and discharge conduits into an open-topped vessel until a projecting wall portion of the pipe bundle sub-assembly rests on an upstanding wall portion of the vessel, whereafter the two wall portions are secured together by means of welding.

Such a method is often used in repairing a defective heat exchanger. The vessel, that is to say, the envelope or shell, of a heat exchanger incorporated in the primary cooling circuit of a nuclear reactor, is commonly sunk into an opening in the concrete floor of a space in the reactor building. Under the concrete floor the conduits of the primary circuit extend towards and away from the vessel. Secured within the vessel is a pipe bundle sub-assembly with supply and discharge conduits, through which sub-assembly the cooling fluid of the secondary cooling circuit is passed.

When there is a defect in the heat exchanger, for example when one of the pipes of the sub-assembly is leaky, the connection at the top of the vessel between the wall of the vessel and the wall of the pipe bundle sub-assembly is broken, for example, by means of a cutter, and the bundle is bodily lifted from the vessel. When the defect has been repaired or the bundle replaced by a new one, the bundle is again lowered into the vessel until the wall portions concerned are in contact with each other, whereafter the wall portions are welded together.

In heat exchangers incorporated between the primary system and the secondary system of a nuclear reactor, the above work must be performed using remote control. In fact, so long as the connection between the pipe bundle sub-assembly and the vessel is broken, there is an open communication between the primary system and the space outside the heat exchanger. So long as there is such an open communication, attendant personnel are not allowed to enter the space concerned for reasons of safety.

Now, if in making the weld, after the pipe bundle has been repositioned within the vessel, there is some failure in the remote-controlled apparatus, or if a fissure or crack has formed in the welded seam, there still is the open communication between the primary system and the space outside the heat exchanger, so that it remains impossible for personnel to enter this space.

It is an object of the present invention to provide a method in which the drawback outlined above is avoided.

In order to achieve this object, the present invention provides a method of assembling the parts of a heat exchanger, which comprises lowering a bundle of pipes with supply and discharge conduits into an open-topped vessel until a projecting wall portion of the pipe bundle sub-assembly rests on an upstanding wall portion of the vessel, and thereafter securing the two wall portions together by means of welding, characterized by the step of providing a sealing ring around the pipe bundle sub-assembly, adjacent the upper end, but below the projecting wall portion thereof, or around an inwardly projecting edge of the wall of the vessel, prior to positioning the sub-assembly within the vessel, said sealing ring being dimensioned so that, when the pipe bundle sub-assembly has been placed in position, the annular opening between the pipe bundle sub-assembly and the wall of the vessel is hermetically sealed at said sealing ring.

Preferably, according to the invention, in a heat exchanger in which at least the pirmary fluid is liquid sodium, a sealing ring of solidified sodium is used. Such a sealing ring can be formed in situ before the pipe bundle is re-positioned within the vessel by forming, by means of a foil, an annular mold around the pipe bundle sub-assembly or on an inwardly projecting edge of the wall of the vessel, pouring liquid sodium into the mold, allowing the liquid sodium to solidify, and removing the foil. The sealing ring can also be formed in situ by winding ribbon-shaped or wire-shaped solid sodium around the pipe bundle sub-assembly. Naturally, when a ring of solid sodium is applied, care shold be taken that the work is done in an atmosphere unreactive to sodium. Thus, for example, an argon atmosphere may be used.

When a ring of solid sodium of sufficient dimensions is used, the sodium will fill the entire space between the pipe bundle sub-assembly and the inner wall of the vessel at this point and provide a proper seal. When the weld connection between the pipe bundle sub-assembly and the vessel has been found to satisfy requirements, the heat exchanger can again be put into operation. Hot liquid sodium will then enter the vessel in the space between the wall of the vessel and the tube bundle. The solid sodium of the sealing ring will melt and be taken up in the hot primary sodium. If desired, the sealing ring of solid sodium can be removed before by supplying heat to the ring by other means to melt it.

The present invention will be described in more detail with reference to the accompanying drawings, in which FIG. 1 is a diagrammatic illustration, in cross-section, of a heat exchanger to which the method according to the present invention can be applied;

Figure 1:
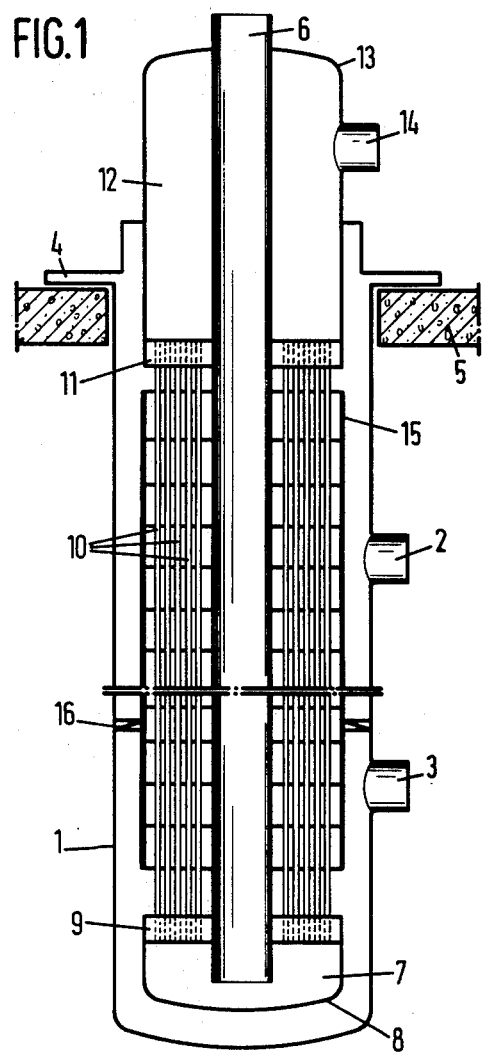

Referring now to the drawings, FIG. 1 diagrammatically shows a heat exchanger to which the method according to the present invention can be applied. The heat exchanger comprises an outer shell or vessel 1, which vessel has a supply conduit 2 for the supply of hot cooling fluid, coming for example from the core of a nuclear reactor, where it has been heated. Vessel 1 further has a discharge conduit 3 for discharging the cooling fluid from the heat exchanger after it has given off heat in the heat exchanger to a different cooling fluid flowing through the heat exchanger (the secondary circuit). Vessel 1 is provided at the top with a flange 4, with which it rests on the rim of a concrete floor 5. The rim of floor 5 defines an opening in the floor, in which vessel 1 is installed. Thus the major part of vessel 1 is located in the space under floor 5. Between flange 4 and floor 5 there is commonly provided a good seal, so that the space under floor 5, through which extend the conduits for the primary cooling circuit (to and from the nuclear reactor), is not in communication with the space above floor 5, where the conduits for the secondary cooling circuit extend.

Arranged within vessel 1 is the pipe bundle sub-assembly of the secondary cooling fluid. This sub-assembly projects from the top of vessel 1, where it is fixedly secured to it, for example by means of welding. The pipe bundle sub-assembly comprises a central tube 6, in which the secondary cooling fluid is supplied. Tube 6 terminates in a bottom header 7, which in essence consists of a vessel 8 which is closed at the top with a tube plate 9 disposed around the mouth of tube 6. A large number of pipes 10 terminate in tube plate 9, through which pipes 10 the secondary cooling fluid supplied to header 7 through tube 6 is again discharged from the header. Pipes 10 terminate at the top in a tube plate 11, which forms the bottom boundary of a header 12 surrounding central tube 6 at the top of the pipe bundle sub-assembly. The wall 13 of header 12 has an opening to which a discharge conduit 14 is connected.

Arranged around the pipe bundle of the pipe bundle sub-assembly within vessel 1 is a cylindrical shield or screen 15, which is of such form that there is an opening at the top and bottom thereof between the space outside screen 15 and the space around pipes 10. Disposed between screen 15 and the wall of vessel 1 is a ring plate partition 16.

In operation, hot primary cooling liquid (e.g., liquid sodium from the nuclear reactor) is supplied through supply conduit 2. In vessel 1, this hot cooling fluid moves upwardly between the wall of vessel 1 and screen 15. Via the opening above screen 15, the cooling fluid moves downwardly between, along, and around pipes 10 to re-enter the space between the wall of vessel 1 and screen 15 through the opening below screen 15, and to be finally discharged through discharge conduit 3. Secondary cooling fluid (e.g., liquid sodium) is simultaneously introduced through tube 6 into header 7, and thence passed through pipes 10 to header 12 and thence discharged through conduit 14. During the passage of the cooling fluids, the hot primary cooling fluid gives off heat to the cooler secondary cooling fluid.

Upon the occurrence of defects in the heat exchanger, e.g., if one of pipes 10 springs a leak, the throughput of cooling fluid through the apparatus is terminated, the weld connection between vessel 1 and the pipe bundle sub-assembly is broken, and the entire pipe bundle sub-assembly is lifted from vessel 1. The cutting of the connection between the pipe bundle sub-assembly and the vessel and the lifting of the bundle from the vessel are commonly effected with remote-controlled apparatus and in an inert atmosphere. After repair of the pipe bundle sub-assembly, or after replacing it by another one, the sub-assembly is again lowered into vessel 1, whereafter the pipe bundle sub-assembly and the vessel are again welded together. Thereafter, attendant personnel can again enter the space around the upper end of the heat exchanger, if necessary. If, however, the weld connection is faulty, e.g., through faulty operation of the remote-controlled welding apparatus, or owing to the occurrence of a crack or fissure in the welded seam, there continues to be an open communication between the space above floor 5 and the primary system, there must then be no admittance to the space.

Now, according to the present invention, when the pipe bundle sub-assembly is re-positioned, there is provided a temporary seal between the sub-assembly and vessel 1. In a heat exchanger in which liquid sodium is the primary and the secondary cooling fluid, the temporary seal according to the invention is a ring of solid (solidified) sodium, which is formed adjacent to the upper end around the pipe bundle sub-assembly. When the bundle is placed the ring is compressed by the weight of the bundle, to fill the annular opening between the pipe bundle sub-assembly and the wall of the vessel, and hence provide a hermetic seal. If desired, the temporary sealing ring may be provided on an inwardly projecting ledge of the wall of the vessel.

Figure 2:
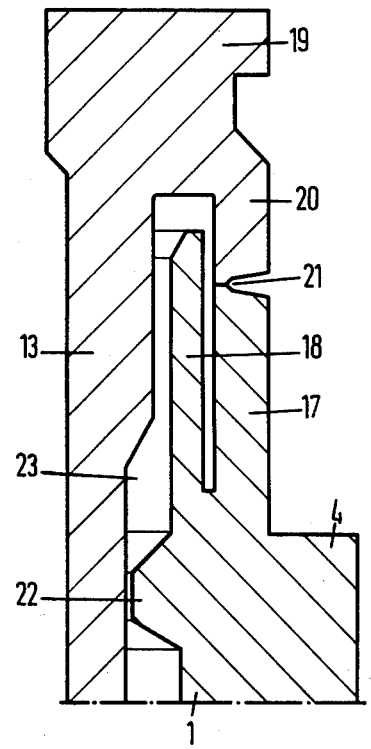
FIG. 2 is a cross-sectional view, showing a portion of the heat exchanger of FIG. 1, which is relevant to the method of the present invention.

FIG. 2 shows the connection between the wall of vessel 1 and the pipe bundle sub-assembly in more detail. Above flange 4, the wall of the vessel 1 forms a cylindrical, upstanding wall portion 17. Arranged inwardly thereof, is a cylindrical screen 18, which extends to a point above wall portion 17. Arranged within vessel 1 is the pipe bundle sub-assembly. As shown, the wall 13 of header 12 at the top of the pipe bundle sub-assembly is provided adjacent to the top of vessel 1 with a thickened portion 19 which at its outer circumference has a depending cylindrical wall portion 20. Wall portion 20 fits exactly on wall portion 17 and around cylindrical screen 18. After the pipe bundle sub-assembly is placed in position, wall portions 17 and 20 are welded together so that there is a welded connection 21 between them.

Wall 13 at the top of the pipe bundle sub-assembly is slightly thickened at the level of the cylindrical screen 18, and below screen 18 the wall of vessel 1 has an inwardly projecting portion 22, so that there is an annular space 23 at the level of screen 18.

Figure 3:
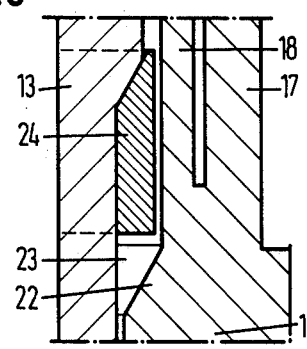
FIG. 3 is a cross-sectional view of a portion of the pipe bundle sub-assembly with a sealing ring around it, and of a portion of the vessel of the heat exchanger, shown prior to the pipe bundle sub-assembly being moved into position.

In FIG. 3, the portion shown in FIG. 2 is again illustrated, and this at a moment when the pipe bundle sub-assembly is nearly in position. A ring 24 of solidified sodium has been applied around the pipe bundle sub-assembly. The dimensions of ring 24 are such that it can fill the annular slot 23 virtually entirely.

Figure 4:
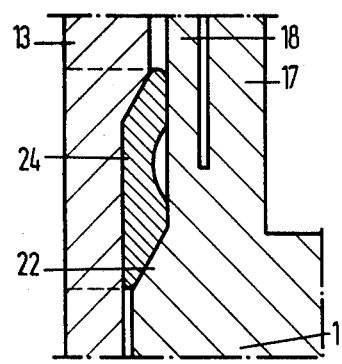
FIG. 4 is a view similar to FIG. 3, with the bundle placed in position.

FIG. 4 illustrates the situation when the bundle is fully in position. The weight of the bundle has collapsed ring 24. The annular space 23 is substantially filled with the collapsed ring 24. At any rate, ring 24 forms a hermetic seal between vessel 1 and the pipe bundle sub-assembly. When the weld connection 21 has been found to be perfect, and the heat-exchanger is again put in operation and its temperature increases, the sodium of ring 24 will melt and run out of space 23. The sodium from ring 24 then joins the sodium of the primary circuit, which of course is not objectionable.

It will be clear that the parts illustrated in the accompanying drawings only serve by way of illustration of the method according to the present invention. The invention can be applied equally well to heat exchangers having differently shaped parts, provided there is a space between the vessel and the pipe bundle sub-assembly, within which a sealing ring applied around the bundle, which ring as stated before may alternatively be arranged on an inwardly projecting edge of the wall of the vessel, can be compressed to form a hermetic seal.

I claim:

1. A method of assembling and sealing a pipe bundle within a shell vessel of a heat exchanger, which includes lowering a pipe bundle sub-assembly having a header at its upper end with an outside wall which telescopes into an open-topped vessel until a circumferential wall portion projecting from the outside wall of the header rests on an outer wall portion of the vessel and welding the two wall portions together to seal the header to the vessel, wherein the improvement comprises:

providing an outwardly extending circumferential projection around the periphery of the outside wall of the header below said circumferential wall portion and an inwardly extending circumferential projection around the inside wall of the vessel, the two projections being positioned so that the inward projection of the vessel is spaced a predetermined distance below the outward projection of the header when said wall portion of the header rests on said wall portion of the vessel so as to form an annular space between said two projections;

applying a deformable sealing ring around the periphery of the header below said outward projection or around the inside wall of the vessel above said inward projection prior to lowering the pipe bundle fully into the vessel, the sealing ring having a radial thickness less than the distance between the periphery of the header and the inside wall of the vessel to provide clearance for lowering the pipe bundle into the vessel and having a volume substantially equal to the volume of said annular space so that the sealing ring deforms to substantially fill said annular space and to hermetically seal between the header and the vessel when said circumferential wall portion of the header rests on said upstanding wall portion of the vessel.

2. A method according to claim 1, including providing the sealing ring of a material that melts at the operating temperature of the heat exchanger.

3. A method according to claim 2, includes providing the sealing ring comprised of solidified sodium.

4. A method according to claim 3, wherein the step of applying the sealing ring comprises:
providing an annular holder around the outside wall of the header below said outward projection by means of a foil;
pouring liquid sodium into said holder;
allowing the liquid sodium to solidify; and
removing the foil.

5. A method according to claim 3, wherein the step of applying the sealing ring comprises winding sodium wire or tape around the outside wall of the header below said outward projection.

* * * * *

UNITED STATES PATENT AND TRADEMARK OFFICE
CERTIFICATE OF CORRECTION

PATENT NO. : 4,202,086
DATED : May 13, 1980
INVENTOR(S) : Buit, Klaas

It is certified that error appears in the above—identified patent and that said Letters Patent is hereby corrected as shown below:

Col. 2, line 6 - change "pirmary" to --primary--.

Col. 2, line 17 - change "shold" to --should--.

Col. 6, line 6 - change "that" to --which--

Signed and Sealed this

Twenty-first Day of July 1981

[SEAL]

Attest:

GERALD J. MOSSINGHOFF

Attesting Officer    Commissioner of Patents and Trademarks